US011990256B2

(12) United States Patent
Takamatsu et al.

(10) Patent No.: US 11,990,256 B2
(45) Date of Patent: May 21, 2024

(54) FLEXIBLE WIRING MEMBER

(71) Applicant: Yazaki Corporation, Tokyo (JP)

(72) Inventors: Masahiro Takamatsu, Makinohara (JP); Yoshiaki Ichikawa, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/568,973

(22) Filed: Jan. 5, 2022

(65) Prior Publication Data

US 2022/0215982 A1 Jul. 7, 2022

(30) Foreign Application Priority Data

Jan. 6, 2021 (JP) ................................ 2021-000949

(51) Int. Cl.
*H01B 7/08* (2006.01)
*H01B 7/00* (2006.01)

(52) U.S. Cl.
CPC ......... *H01B 7/0823* (2013.01); *H01B 7/0009* (2013.01)

(58) Field of Classification Search
CPC ... H01B 7/02; H01B 7/07; H01B 7/08; H01B 11/02; H01B 11/04; H01B 11/06
USPC ...... 174/110 R, 113 R, 117 R, 117 F, 117 FF
See application file for complete search history.

(56) References Cited

U.S. PATENT DOCUMENTS 3,459,879 A * 8/1969 Gerpheide ............... H01B 7/08 174/117 FF
4,490,690 A * 12/1984 Suzuki ................. H05K 1/0219 174/117 FF
4,707,671 A * 11/1987 Suzuki ..................... H05K 3/28 174/117 FF
4,801,764 A * 1/1989 Ohlhaber ................. H01B 7/08 174/117 F
6,203,343 B1 * 3/2001 Chevassus-More ......................... B60R 16/0207 174/72 B
2013/0056248 A1 3/2013 Kajiya et al.
2017/0149111 A1 * 5/2017 Yosui .................. H05K 1/0253
(Continued)

FOREIGN PATENT DOCUMENTS

JP 6-38118 U 5/1994
JP 2011-228077 A 11/2011
(Continued)

*Primary Examiner* — William H. Mayo, III
(74) *Attorney, Agent, or Firm* — Sughrue Mion, PLLC

(57) ABSTRACT

A flexible wiring member capable of electrically connecting desired points separated in a length direction. The flexible wiring member includes conductor holding layers that are formed in a state of being stacked in a thickness direction and being electrically insulated from one another; power supply line conductors that have a wide width and are respectively disposed in both of a first conductor holding layer and a second conductor holding layer adjacent to each other in the thickness direction; and communication line conductors that have a width smaller than that of the power supply line conductors and are disposed in one of the first conductor holding layer and the second conductor holding layer, in which the conductor holding layers are formed by an insulating resin, and directly cover the power supply line conductors and the communication line conductors.

5 Claims, 5 Drawing Sheets

(56) References Cited

U.S. PATENT DOCUMENTS

| | | | |
|---|---|---|---|
| 2019/0165558 | A1 | 5/2019 | Katagai et al. |
| 2020/0324718 | A1 | 10/2020 | Bilas et al. |
| 2020/0335240 | A1 | 10/2020 | Ooi et al. |
| 2021/0193348 | A1 | 6/2021 | Ooi et al. |
| 2021/0335520 | A1 | 10/2021 | Ooi et al. |

FOREIGN PATENT DOCUMENTS

| | | | |
|---|---|---|---|
| JP | 2019-96546 | A | 6/2019 |
| JP | 2020-191215 | A | 11/2020 |
| WO | 01/50482 | A1 | 7/2001 |
| WO | 2016/163436 | A1 | 10/2016 |
| WO | 2019093309 | A1 | 5/2019 |

* cited by examiner

FLEXIBLE WIRING MEMBER

CROSS REFERENCE TO RELATED APPLICATIONS

This application is based on and claims priority from Japanese patent application No. 2021-000949 filed on Jan. 6, 2021, the entire contents of which are incorporated herein by reference.

TECHNICAL FIELD

The present invention relates to a flexible wiring member that can be used for electrically connecting a plurality of devices in a vehicle or the like.

BACKGROUND ART

In a vehicle, a plurality of devices such as electronic control units (ECU) are generally electrically connected to one another using a wiring member configured as a wire harness or the like. In such a case, the wiring member that connects the plurality of devices often includes a wiring member for a power supply line and a wiring member for a communication line. It is assumed that the wiring member for a power supply line and the wiring member for a communication line are wired in a manner of passing through almost the same paths, but these wiring members are normally assembled to a wire harness as independent components.

On the other hand, for example, Patent Literature 1 discloses a composite cable having sufficient performance as a wire harness. The composite cable includes a cylindrical body, a belt-shaped body having conductivity and extending along an axial direction of the cylindrical body, and an outer cover made of an insulating material that covers the cylindrical body and the belt-shaped body. The outer cover has a flat cross section when cut perpendicularly to the axial direction. The cylindrical body and the belt-shaped body are arranged side by side in a short axis direction of the cross section of the outer cover. The belt-shaped body is arranged such that a longitudinal direction of a cross section of the belt-shaped body when cut perpendicularly to the axial direction is along a long axis direction of the cross section of the outer cover.

In a composite transmission line disclosed in Patent Literature 2, a plurality of signal transmission lines and a power transmission line are formed as a stacked insulator in which a plurality of insulator layers are stacked, and the composite transmission line includes a first signal transmission line, a second signal transmission line, and the power transmission line. The power transmission line includes power transmission conductor patterns formed along a plurality of layers of the stacked insulator and an interlayer connection conductor that connects the power transmission conductor patterns between layers. A first signal conductor pattern of the first signal transmission line, a second signal conductor pattern of the second signal transmission line, and the power transmission conductor patterns are formed in different layers of the stacked insulator and are formed in parallel to one another. The first signal conductor pattern and the second signal conductor pattern are disposed in a manner of sandwiching a first ground conductor in a stacking direction of the insulator layer, and the power transmission line is disposed at a side portion of the first signal conductor pattern.

Patent Literature 3 discloses a technique of a flat bus equipped with a wire that can be used for a power supply path and a signal path. In the flat bus equipped with a wire, at least one flat conductor and at least one wire are arranged in parallel and are fixed by an insulating material.

Patent Literature 4 discloses a flat cable in which a plurality of current conductors and a plurality of data conductors are arranged in substantially the same plane in a manner of being adjacent to one another in a width direction. The plurality of data conductors are disposed between the plurality of current conductors. The cable includes a wavy elbow at a predetermined bending point.

CITATION LIST

Patent Literature

Patent Literature 1: JP-A-2020-191215
Patent Literature 2: WO2016/163436
Patent Literature 3: JP-U-6-38118
Patent Literature 4: WO01/50482

SUMMARY OF INVENTION

When any one of the techniques disclosed in Patent Literatures 1 to 4 is used, a plurality of types of electric wires such as a power supply line and a communication line can be wired together in one cable or the like. Since a current flows in the power supply line is generally larger than a current flows in the communication line, a cross-sectional area of a conductor of the power supply line needs to be increased.

Therefore, for example, a belt-shaped body 5A (that is, a bus bar) disclosed in Patent Literature 1, a flat conductor 1 disclosed in Patent Literature 3, and a current conductor 1 having a rectangular cross-sectional shape as disclosed in Patent Literature 4 are used. In a case where no very large current flows through the power supply line or in a case where a total length of a line is relatively short, for example, as disclosed in Patent Literature 2, it is also possible to make widths or cross-sectional areas of power transmission conductor patterns 41 to 45 and signal conductor patterns 31 and 32 equal to one another. When it is assumed that a cable length is about several meters, such as a wire harness wired in a vehicle, it is important to sufficiently increase the cross-sectional area of the power supply line to reduce loss and heat generation due to a voltage drop.

However, when the cross-sectional area of the power supply line is increased in order to flow a large current, rigidity of a corresponding component is increased, and thus resistance to vibration is reduced even when a component having any shape of an electric wire and a bus bar is used. Since bending is difficult when the rigidity is increased, it is difficult to absorb tolerance in a wiring member, and workability of wiring a wire harness in a vehicle is poor.

Further, even when the power supply line and the communication line are individually wired by independent components, the number of work steps increases. In a case where components having different types of electric wires or different cross-sectional areas are selectively used for each path in accordance with a current value to be handled, since the number of parts of a cable increases, component costs may increase and work efficiency may be low.

The present invention has been made in view of the above circumstances, and an object of the present invention is to provide a flexible wiring member that has high flexibility and is easy to be wired while allowing energization of a relatively large current.

According to an embodiment, a flexible wiring member is capable of electrically connecting a plurality of desired points separated in a length direction. The flexible wiring member comprises:

a plurality of conductor holding layers that are formed in a state of being stacked in a thickness direction and being electrically insulated from one another;

power supply line conductors that have a wide width and are respectively disposed in both of a first conductor holding layer and a second conductor holding layer that are adjacent to each other in the thickness direction; and a plurality of communication line conductors that have a width smaller than that of the power supply line conductors and are disposed in one of the first conductor holding layer and the second conductor holding layer, wherein the plurality of conductor holding layers are formed by an insulating resin, and directly cover the power supply line conductors and the communication line conductors.

DESCRIPTION OF EMBODIMENTS

A specific embodiment of the present invention will be described below with reference to the drawings.

<Shape of Flexible Wiring Member>

Figure 1A:
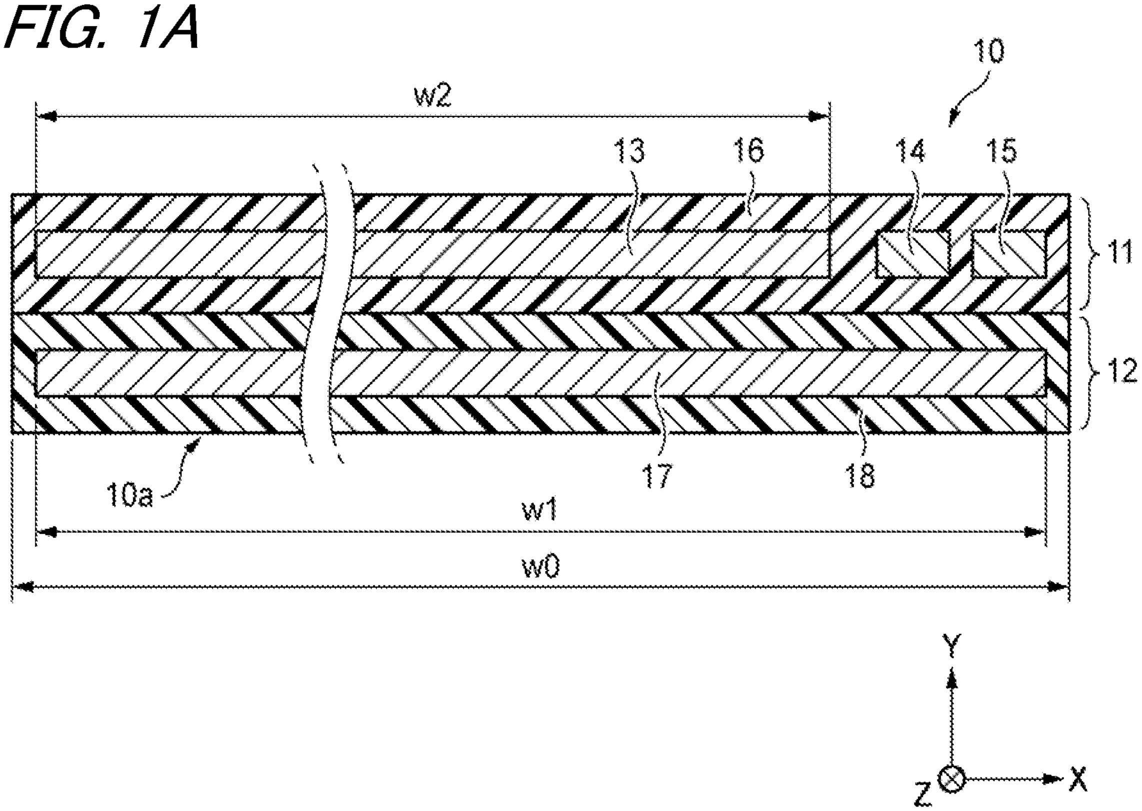
FIG. 1A is a longitudinal cross-sectional view and FIG. 1B is a perspective view both showing a flexible wiring member according to an embodiment of the present invention.
Figure 1B:
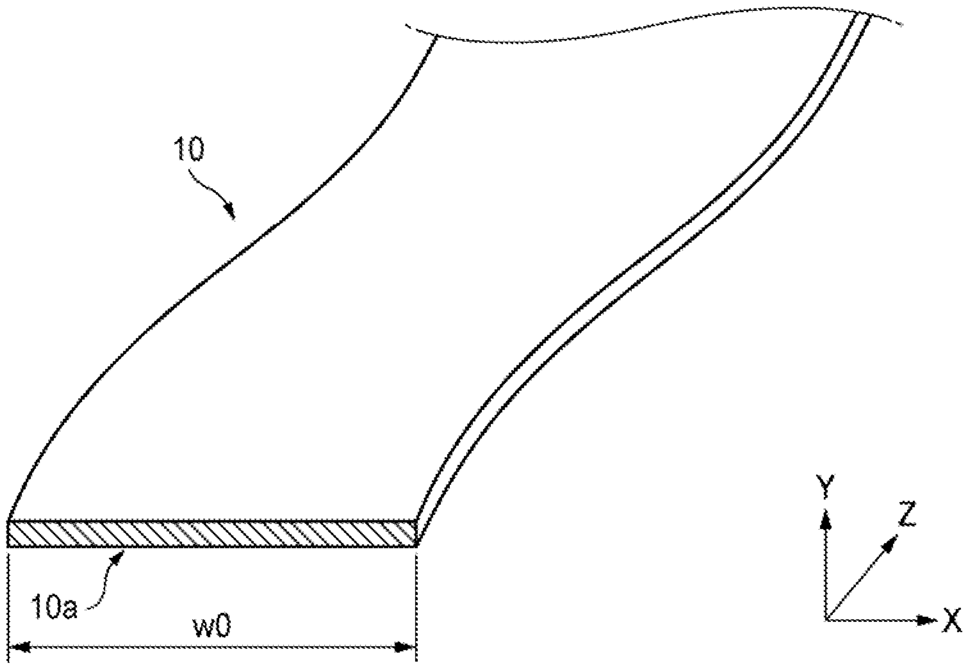

FIG. 1A is a longitudinal cross-sectional view and FIG. 1B is a perspective view both showing a flexible wiring member 10 according to an embodiment of the present invention.

In FIGS. 1A and 1B, an X axis, a Y axis, and a Z axis respectively correspond to a width direction, a thickness direction, and a length direction of the flexible wiring member 10.

As shown in FIGS. 1A and 1B, the flexible wiring member 10 has a structure suitable for mounting in a vehicle or the like and suitable for being used as a wiring member for a wire harness that electrically connects a plurality of electronic devices (ECU and the like) to one another. The flexible wiring member 10 can simultaneously connect both a power supply path and a communication path. In recent years, a vehicle such as a hybrid vehicle or an electric vehicle often handles a high-voltage power supply. Accordingly, the flexible wiring member 10 is configured to handle a high-voltage power supply current of, for example, about several hundred volts.

As shown in FIG. 1B, the flexible wiring member 10 has a thin and wide planar outer shape, and can be used as a long wiring member. Therefore, the flexible wiring member 10 has particularly high flexibility in the thickness direction, and can be easily shaped by being bent or twisted in the thickness direction so as to follow a predetermined wiring path having a complicated shape in a vehicle or the like. As a result, tolerance can be easily absorbed.

<Cross-Sectional Configuration>

As shown in FIG. 1A, a cross section 10*a* of the flexible wiring member 10 includes a first layer 11 disposed at an upper side in the thickness direction (Y-axis direction) and a second layer 12 disposed at a lower side in the thickness direction, and the first layer 11 and the second layer 12 are stacked. Although a case of a two-layer structure is described as an example in FIG. 1A, the number of layers may be three or more.

In the flexible wiring member 10, the first layer 11 includes one power supply line 13 and two communication lines 14 and 15 arranged adjacent to each other. The power supply line 13 and the communication lines 14 and 15 are arranged in a row in the width direction (X-axis direction). The periphery of each of the power supply line 13 and the communication lines 14 and 15 is covered with an insulating sheath 16 made of resin or the like.

The power supply line 13 is made of a metal having good conductivity such as copper, and for example, the power supply line 13 is formed to have a wide cross-sectional shape as shown in FIG. 1A. That is, the power supply line 13 is made of a metal material having a foil shape or a thin plate shape, or is formed into a thin plate shape formed by stacking metal materials having a foil shape, so that a conductor width w2 is sufficiently large.

Since the power supply line 13 is used to supply a relatively large power supply current, it is necessary to increase a cross-sectional area of the power supply line 13 to reduce a resistance value so as to prevent the occurrence of a voltage drop. In order to improve the flexibility in the thickness direction, it is necessary to reduce a thickness of the power supply line 13. Therefore, a cross-sectional shape of the power supply line 13 is formed to be wide. That is, the conductor width w2 is set to a large value by an amount at which a height (thickness) of the power supply line 13 is smaller than an electric wire in the related art, so that a cross-sectional area of the power supply line 13 is equal to a cross-sectional area of the electric wire in the related art having the same conductivity when the electric wire in the related art is used as the power supply line 13, while ensuring the flexibility of the power supply line 13 in the thickness direction. Therefore, the term “wide” refers to a dimension that can satisfy such a condition. The same applies to widths of other power supply lines and power supply ground lines in the present specification.

Since the communication lines 14 and 15 are used for the purpose of allowing only a signal of communication with a small current, it is not necessary to increase cross-sectional areas of the communication lines 14 and 15, but it is necessary to secure flexibility and durability against bending and vibration. Therefore, the communication lines 14 and 15 are formed to have a cross-sectional shape such as a circular shape or a rectangular shape by bundling a large number of conductive metal wires such as very thin copper wires. The communication lines 14 and 15 may be made of a conductive metal such as a copper foil having a thickness and a material the same as those of the power supply lines 13 and a power supply line 17.

The insulating sheath 16 is made of a soft material such as resin having a sufficient withstand voltage against a high voltage of a power supply, and covers peripheries of the power supply line 13 and the communication lines 14 and 15 so as to electrically separate the power supply line 13 and the communication lines 14 and 15 from one another and separate the second layer 12 or an outer side of the flexible wiring member 10 from the power supply line 13 and the communication lines 14 and 15, so that the occurrence of an electric shock, a short circuit, an electric leakage, and the like can be prevented.

Since the communication lines 14 and 15 handle low voltage signals, an interval between the communication line 14 and the communication line 15 can be made relatively small. On the other hand, since the power supply line 13 handles a high voltage, the power supply line 13 and the communication lines 14 and 15 are spaced at a necessary interval so as to obtain a sufficient withstand voltage.

On the other hand, the second layer 12 includes one power supply line 17 and an insulating sheath 18 that covers the periphery of the power supply line 17. The power supply line 17 is made of a metal having good conductivity such as copper, and is formed to have a wide cross-sectional shape as shown in FIG. 1A. That is, the power supply line 17 is made of a metal material having a foil shape or a thin plate shape, or is formed into a thin plate shape formed by stacking metal materials having a foil shape, so that a conductor width w1 is sufficiently large.

The conductor width w1 of the power supply line 17 is formed to be slightly larger than the conductor width w2 of the power supply line 13. A dimension obtained by adding a width for arranging the communication lines 14 and 15 to the conductor width w2 of the power supply line 13 matches the conductor width w1. Since an outer side of the power supply line 17 in the width direction is covered with the insulating sheath 18, a cable width w0 is slightly larger than the conductor width w1.

The insulating sheath 18 of the second layer 12 is made of the same material as the insulating sheath 16 of the first layer 11. That is, the insulating sheath 18 is made of a soft material such as resin having a sufficient withstand voltage against a high voltage of a power supply, and covers peripheries of the power supply line 17 and an outer side of the first layer 11 or the flexible wiring member 10 so as to electrically separate the power supply line 17 from the outer side of the first layer 11 or the flexible wiring member 10, so that the occurrence of an electric shock, a short circuit, an electric leakage, and the like can be prevented.

<Specification of Flexible Wiring Member 10>

In the present embodiment, a specification is defined so that the power supply lines 13 and 17 arranged in two layers are simultaneously used as a common power supply line when the flexible wiring member 10 shown in FIG. 1A is wired and used by a user. It is assumed that a power supply ground wire is separately prepared by using a body ground of a vehicle or the like. Therefore, the flexible wiring member 10 according to the present embodiment is used in a state in which the two power supply lines 13 and 17 are electrically connected in parallel.

A power supply current simultaneously flows in the same direction on the power supply line 13 and the power supply line 17 from a device at the power supply side that is connected to one end in a length direction (Z-axis direction) of the flexible wiring member 10 toward a device at a load side that is connected to the other end.

As a method of connecting the two power supply lines 13 and 17 in parallel, an interlayer connection line (not shown) that connects the power supply line 13 and the power supply line 17 may be disposed in the flexible wiring member 10 between the first layer 11 and the second layer 12, the two power supply lines 13 and 17 may be electrically connected in a connector (not shown) that is connected to an end portion of the flexible wiring member 10, or the two power supply lines 13 and 17 may be electrically connected to each other at a device side that is connected to the flexible wiring member 10.

In this manner, a sufficiently large cross-sectional area can be secured at a portion serving as a path of a power supply current by connecting the power supply lines 13 and 17 of two layers in parallel. That is, even when the thickness of each of the power supply lines 13 and 17 is small, a width dimension is limited, and a cross-sectional area is insufficient, a total cross-sectional area can be increased and a resistance value can be reduced by connecting the two power supply lines 13 and 17 in parallel.

Since the two power supply lines 13 and 17 are used in a state of being connected in parallel, a thickness of a conductor of each of the power supply lines 13 and 17 can be reduced. Accordingly, it is easy to increase the flexibility of the flexible wiring member 10.

On the other hand, the two communication lines 14 and 15 can be used as a pair of transmission lines for communication, such as a Controller Area Network (CAN) bus mounted in a vehicle or the like. As shown in FIG. 1A, since the two communication lines 14 and 15 are both disposed in the first layer 11, that is, in the same layer, the two communication lines 14 and 15 can be arranged in a state of being close to each other, and a noise countermeasure is relatively easy to make.

<Manufacturing Process of Flexible Wiring Member 10>

The flexible wiring member 10 shown in FIGS. 1A and 1B can be manufactured by, for example, the following procedure when a general extrusion molding technique is used.

(1) Long-length power supply lines 13 and 17 and communication lines 14 and 15 are prepared as core wires.

(2) In order to form the first layer 11, the power supply line 13 and the communication lines 14 and 15, which are core wires, are arranged in a row at a predetermined interval and are arranged in a path passing through an extruder, and each core wire is gradually pulled from a tip end side. The insulating sheath 16 is formed of a molten resin in a manner of covering outer sides of all of the core wires when passing through the extruder. The insulating sheath 16 in a molten state is cooled in a water tank or the like to mold the first layer 11.

(3) In order to form the second layer 12, the power supply line 17 serving as a core wire is disposed in a path passing through the extruder, and the core wire is gradually pulled from the tip end side. The insulating sheath 18 is formed in a manner of covering an outer side of the power supply line 17 that is all core wires when passing through the extruder. The insulating sheath 18 in a molten state is cooled in a water tank or the like to mold the second layer 12.

(4) The molded first layer 11 and the molded second layer 12 are stacked and bonded in the thickness direction, and are molded into a state of the flexible wiring member 10 in which the first layer 11 and the second layer 12 are integrated.

As will be described later, the first layer 11 and the second layer 12 may be simultaneously molded in one step.

A plurality of flexible printed circuits (FPC) may be stacked and integrated in the thickness direction to manufacture the flexible wiring member 10 having the same configuration as described above. In this case, an outer side of the flexible wiring member 10 is covered with an insulating sheath so that a conductor is not exposed to the outer side.

As described above, in the flexible wiring member 10 according to the embodiment of the present invention, since the thickness of each of the power supply lines 13 and 17 is small and the power supply lines 13 and 17 are easily bent, the flexible wiring member 10 can be easily wired along wiring paths having various shapes. Since flexibility is high, durability against vibration is high, tolerance can be absorbed, and automatic assembly of a wire harness can be handled.

Since the power supply lines 13 and 17 and the communication lines 14 and 15 are integrated with one another, connection can be completed by wiring the single flexible wiring member 10 only in order to electrically connect a plurality of devices such as various ECUs. Therefore, the structure can be simplified and work efficiency can be improved.

In particular, since the specification is defined such that the power supply lines 13 and 17 of a plurality of layers are electrically connected in parallel and used, and the power supply lines 13 and 17 can be formed using a thin and wide conductor, a cross-sectional area of the entire conductor can be increased while ensuring the flexibility of the flexible wiring member 10, and a resistance value can be sufficiently reduced.

As shown in FIG. 1A, since the conductor width w2 of the power supply line 13 of the first layer 11 is formed to be smaller than the conductor width w1 of the power supply line 17 of the second layer 12, an arrangement space of the communication lines 14 and 15 can be easily ensured in the first layer 11. Therefore, it is possible to prevent the cable width w0 from increasing more than necessary.

<First Modification>

Figure 2:
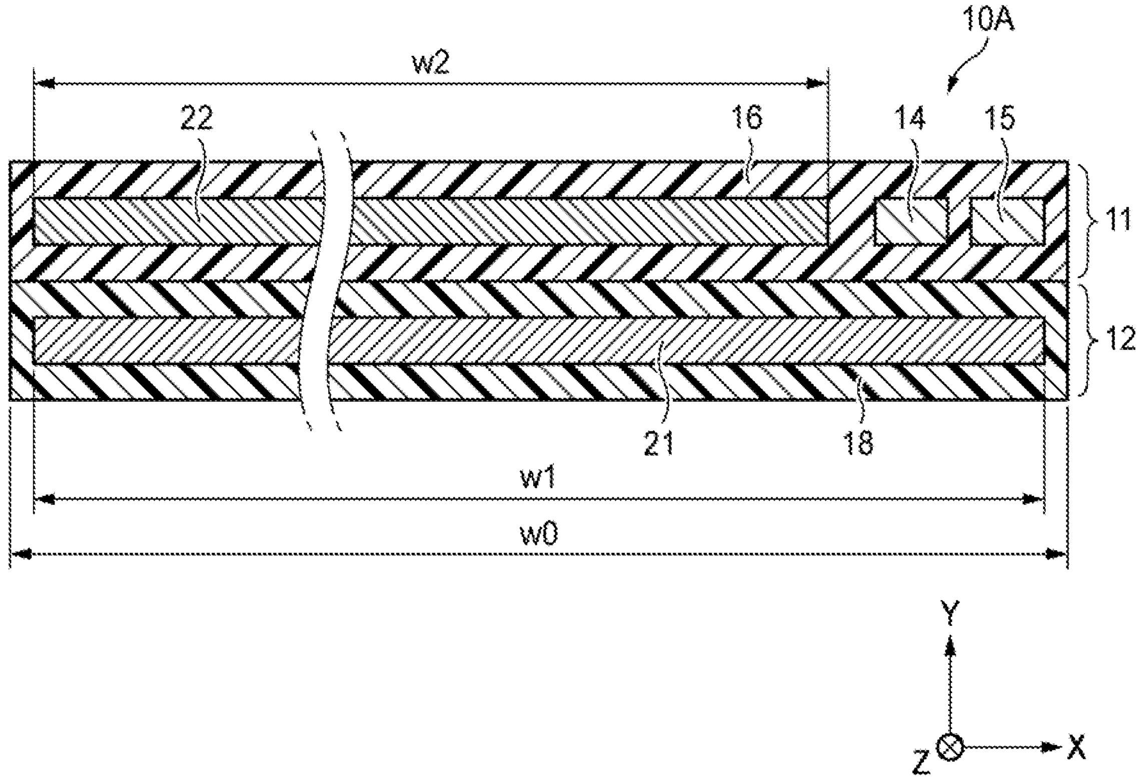
FIG. 2 is a longitudinal cross-sectional view showing a flexible wiring member according to a first modification.

FIG. 2 is a longitudinal cross-sectional view showing a flexible wiring member 10A according to a first modification.

The flexible wiring member 10A shown in FIG. 2 includes the first layer 11 and the second layer 12 that are disposed in a manner of overlapping with each other in the thickness direction (Y-axis direction) in a similar manner to the flexible wiring member 10 shown in FIG. 1A.

A power supply ground line 22 and the communication lines 14 and 15 are arranged in a row in the first layer 11 of the flexible wiring member 10A. Peripheries of the power supply ground line 22 and the communication lines 14 and 15 are covered with the insulating sheath 16 made of resin or the like.

The power supply ground line 22 is made of a metal having good conductivity such as copper, and for example, the power supply ground line 22 is formed to have a wide cross-sectional shape as shown in FIG. 2. That is, the power supply ground line 22 is made of a metal material having a foil shape or a thin plate shape, or is formed into a thin plate shape formed by stacking metal materials having a foil shape, so that the conductor width w2 is sufficiently large.

Since the power supply ground line 22 is used to supply a relatively large power supply current, it is necessary to increase a cross-sectional area of the power supply ground line 22 to reduce a resistance value so as to prevent the occurrence of a voltage drop. In order to improve the flexibility in the thickness direction, it is necessary to reduce a thickness of the power supply ground line 22. Therefore, a cross-sectional shape of the power supply ground line 22 is formed to be wide.

Configurations of the communication lines 14 and 15 and the insulating sheath 16 in the first layer 11 of the flexible wiring member 10A are the same as those of the flexible wiring member 10 shown in FIG. 1A.

On the other hand, the second layer 12 of the flexible wiring member 10A is formed by one power supply line 21 and the insulating sheath 18 that covers the periphery of the power supply line 21. The power supply line 21 is made of a metal having good conductivity such as copper, and for example, the power supply line 21 is formed to have a wide cross-sectional shape as shown in FIG. 2. That is, the power supply line 21 is made of a metal material having a foil shape or a thin plate shape, or is formed into a thin plate shape formed by stacking metal materials having a foil shape, so that the conductor width w1 is sufficiently large.

The conductor width w1 of the power supply line 21 is formed to be slightly larger than the conductor width w2 of the power supply ground line 22. A dimension obtained by adding a width for arranging the communication lines 14 and 15 to the conductor width w2 of the power supply ground line 22 matches the conductor width w1. Since an outer side of the power supply line 21 in the width direction is covered with the insulating sheath 18, the cable width w0 is slightly larger than the conductor width w1.

The insulating sheath 18 of the second layer 12 is made of the same material as the insulating sheath 16 of the first layer 11. That is, the insulating sheath 18 is made of a soft material such as resin having a sufficient withstand voltage against a high voltage of a power supply, and covers peripheries of the power supply line 21 and outer sides of the conductors in the first layer 11 and the flexible wiring member 10A so as to electrically separate the power supply line 21 from the outer sides of the conductors in the first layer 11 and the flexible wiring member 10A, so that the occurrence of an electric shock, a short circuit, an electric leakage, and the like can be prevented.

In the present embodiment, a specification is defined such that the power supply line 21 of the second layer 12 is used as a power supply line (normally, a positive electrode) for supplying power and the power supply ground line 22 of the first layer 11 is used for connection to a ground (normally, a negative electrode: a ground) of a power supply, when a user wires and uses the flexible wiring member 10A shown in FIG. 2.

Therefore, a power supply current flows on the power supply line 21 from a device at the power supply side that is connected to one end of the flexible wiring member 10A in the length direction (Z-axis direction) toward a device at a load side that is connected to the other end. A current flows on the power supply ground line 22 adjacent to the power supply line 21 in a direction opposite to that on the power supply line 21.

On the other hand, the two communication lines 14 and 15 can be used as a pair of transmission lines for communication, such as a CAN bus mounted in a vehicle or the like. In the flexible wiring member 10A shown in FIG. 2, since the power supply ground line 22 is arranged at a position adjacent to the two communication lines 14 and 15 in the same first layer 11 as the two communication lines 14 and 15, a noise countermeasure is easy to make for a signal transmitted by communication. That is, since there is almost no change in potential of the ground, even when a voltage on the power supply line 21 or the like greatly fluctuates due to noises, a shielding effect of the power supply ground line 22 can be expected so that voltage fluctuation hardly affects the communication lines 14 and 15.

<Second Modification>

Figure 3:
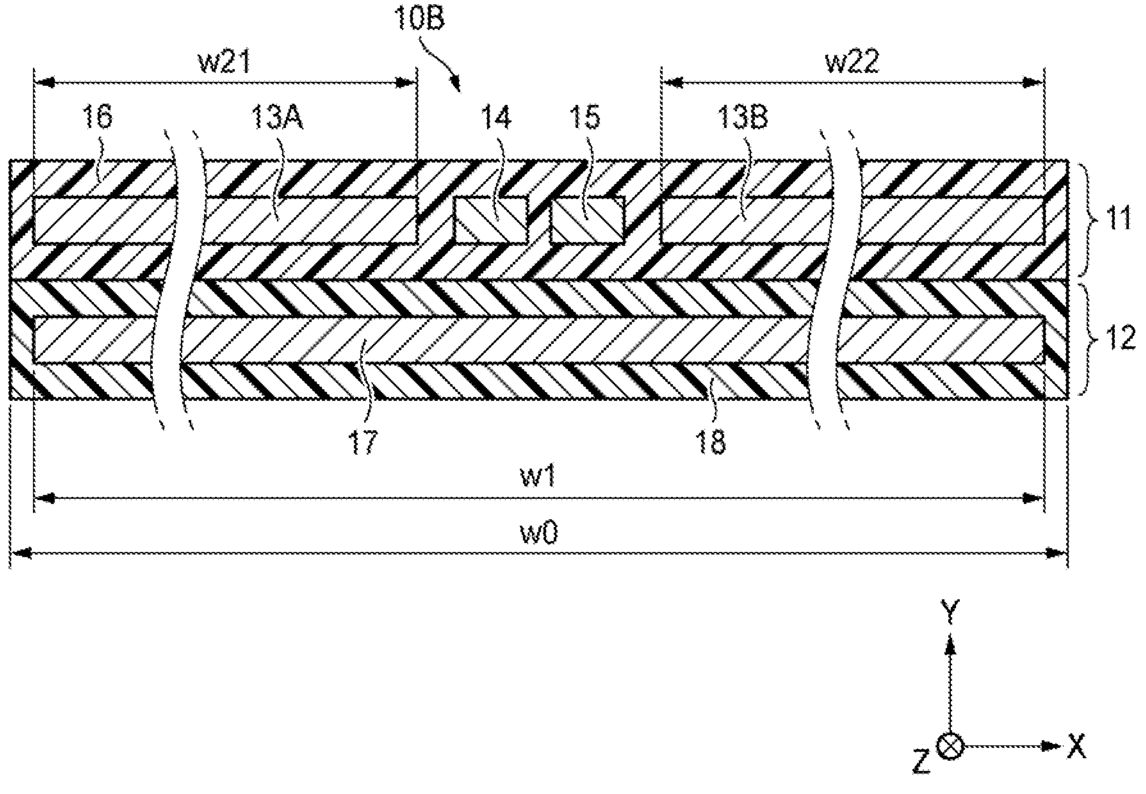
FIG. 3 is a longitudinal cross-sectional view showing a flexible wiring member according to a second modification.

FIG. 3 is a longitudinal cross-sectional view showing a flexible wiring member 10B according to a second modification.

In the flexible wiring member 10B shown in FIG. 3, two power supply lines 13A and 13B, and the communication lines 14 and 15 are arranged in a line in the first layer 11. The communication lines 14 and 15 are disposed in a substantially central portion in the width direction, the power supply line 13A is disposed at a left side of the communication lines 14 and 15, and the power supply line 13B is disposed at a right side of the communication lines 14 and 15.

The two power supply lines 13A and 13B have a thin and wide cross-sectional shape. A conductor width w21 of the power supply line 13A and a conductor width w22 of the power supply line 13B are slightly smaller than half of the conductor width w1 of the power supply line 17.

The configuration of the flexible wiring member 10B other than the above is the same as that of the flexible wiring member 10 shown in FIG. 1A.

In the flexible wiring member 10B, it is assumed that a specification is defined such that the two power supply lines 13A and 13B are used in a state of being electrically connected in parallel to the power supply line 17 of the second layer 12. Another specification may be defined such that one or both of the two power supply lines 13A and 13B are used as a power supply ground line in a similar manner to the power supply ground line 22 shown in FIG. 2.

<Third Modification>

Figure 4:
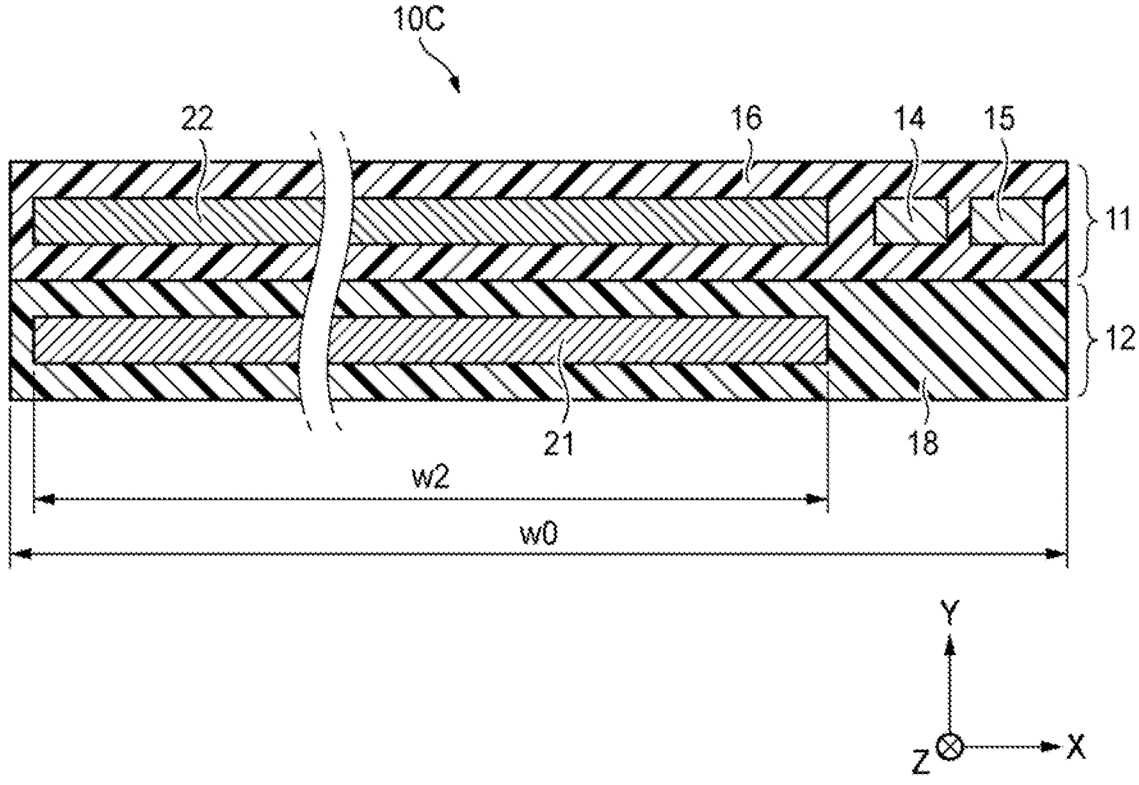
FIG. 4 is a longitudinal cross-sectional view showing a flexible wiring member according to a third modification.

FIG. 4 is a longitudinal cross-sectional view showing a flexible wiring member 10C according to a third modification.

In the flexible wiring member 10C shown in FIG. 4, the conductor width w2 of the power supply ground line 22 disposed in the first layer 11 and the conductor width w2 of the power supply line 21 disposed in the second layer 12 are formed to have substantially the same dimensions, and the power supply line 21 and the power supply ground line 22 are disposed to have a positional relationship in which the power supply line 21 and the power supply ground line 22 face each other in the thickness direction. The communication lines 14 and 15 are disposed at positions adjacent to a right side of the power supply ground line 22 in the width direction.

The configuration of the flexible wiring member 10C other than the above is the same as that of the flexible wiring member 10A shown in FIG. 2. Therefore, the cable width w0 of the flexible wiring member 10C is larger than the conductor width w2 of the power supply line 21 and the power supply ground line 22 by an amount of a space in which the communication lines 14 and 15 are arranged.

<Fourth Modification>

Figure 5:
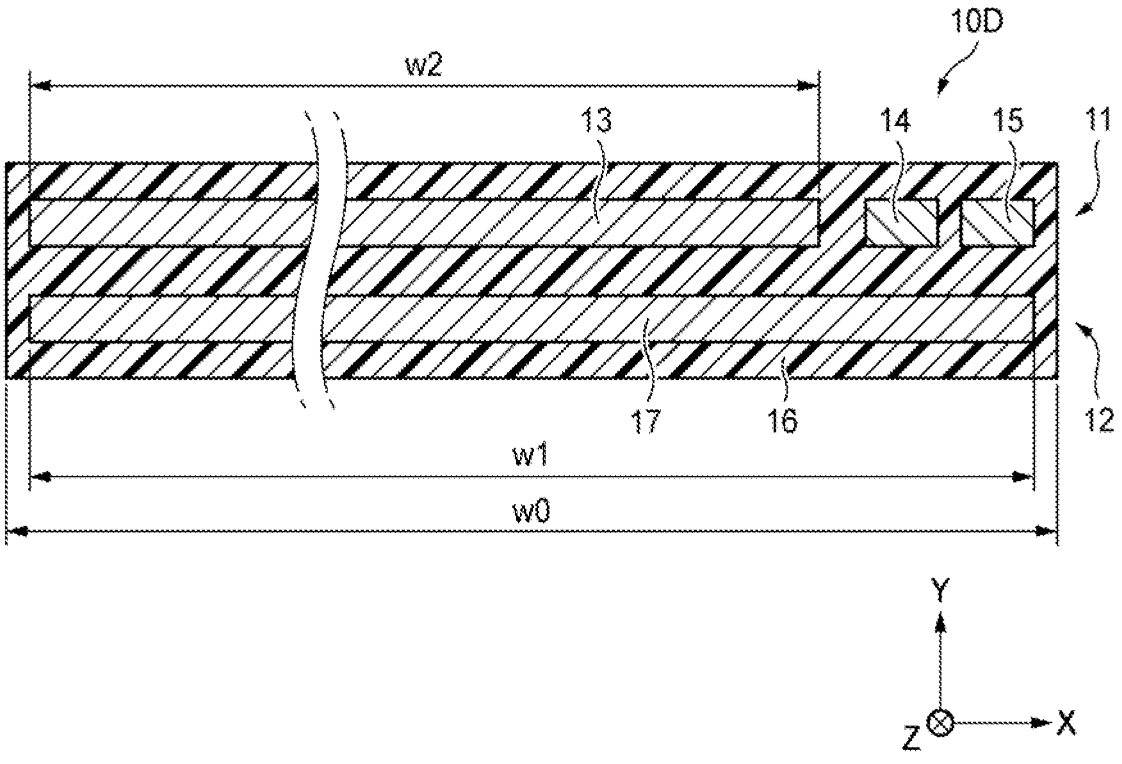
FIG. 5 is a longitudinal cross-sectional view showing a flexible wiring member according to a fourth modification.

FIG. 5 is a longitudinal cross-sectional view showing a flexible wiring member 10D according to a fourth modification.

In the flexible wiring member 10D shown in FIG. 5, there is no boundary between the first layer 11 and the second layer 12. That is, when the first layer 11 and the second layer 12 are molded together by one extrusion molding, the boundary between the first layer 11 and the second layer 12 is eliminated as in the flexible wiring member 10D shown in FIG. 5.

The flexible wiring member 10D shown in FIG. 5 can be manufactured, for example, by the following procedure.

(1) Long-length power supply lines 13 and 17 and communication lines 14 and 15 are prepared as core wires.

(2) In order to form the first layer 11 and the second layer 12, the power supply line 13 and the communication lines 14 and 15, which are core wires, are arranged in a line at a predetermined interval, the power supply line 17 is arranged below the power supply line 13 and the communication lines 14 and 15, the core wires are arranged in a path passing through the extruder, and each core wire is gradually pulled from the tip end side. The insulating sheath 16 is formed of a molten resin in a manner of covering outer sides of all of the core wires when passing through the extruder. The insulating sheath 16 in a molten state is cooled in a water tank or the like to mold the first layer 11 and the second layer 12. As a result, the first layer 11 and the second layer 12 are simultaneously molded and the entire flexible wiring member 10D is molded.

According to an embodiment, there is provided a flexible wiring member (10) capable of electrically connecting a plurality of desired points separated in a length direction (Z-axis direction), the flexible wiring member (10) including

- a plurality of conductor holding layers (the first layer 11 and the second layer 12) that are formed in a state of being stacked in a thickness direction and being electrically insulated from one another;
- power supply line conductors (the power supply lines 13 and 17) that have a wide width and are respectively disposed in both of a first conductor holding layer (the first layer 11) and a second conductor holding layer (the second layer 12) that are adjacent to each other in the thickness direction; and
- a plurality of communication line conductors (the communication lines 14 and 15) that have a width smaller than that of the power supply line conductors and are disposed in one of the first conductor holding layer and the second conductor holding layer,
- in which the plurality of conductor holding layers are formed by an insulating resin (the insulating sheaths 16 and 18), and directly cover the power supply line conductors and the communication line conductors.

According to the flexible wiring member having the above configuration, since the power supply line conductor and the communication line conductor are arranged in the wiring member having a structure in which the plurality of conductor holding layers are stacked, the power supply line and the communication line that pass through a common wiring path can be implemented by wiring the single wiring member only. Since the power supply wire conductors having a wide width are disposed in adjacent layers, even when a large cross-sectional area is required to handle a relatively large current, the power supply wire conductors of the respective layers can be made of a thin material, and the flexibility of the entire wiring member in the thickness direction can be increased. Since the plurality of communication line conductors are disposed in only one of the first conductor holding layer and the second conductor holding layer, it is easy to make a noise countermeasure. Since the insulating resin that separates the plurality of conductor holding layers from one another forms a direct coating on the power supply wire conductor, it is easy to reduce the number of components constituting the wiring member and simplify a manufacturing process.

In the flexible wiring member, each of the power supply line conductors may be a high-voltage power supply line conductor.

According to the flexible wiring member having the above configuration, since the power supply line conductor is formed to be wide, the high-voltage power supply line and the communication line can be easily wired while reducing loss and heat generation due to a voltage drop which is particularly remarkable when the flexible wiring member is connected to a high-voltage power supply or a high-voltage load.

In the flexible wiring member, a width dimension (the conductor width w2) of a first power supply line conductor disposed in the first conductor holding layer together with the communication line conductors may be formed to be smaller than a width dimension (the conductor width w1) of a second power supply line conductor disposed in the second conductor holding layer.

According to the flexible wiring member having the above configuration, it is possible to prevent the width dimension of the entire wiring member from being excessively increased due to the influence of the communication line conductor.

In the flexible wiring member, usage restrictions may be made in which a direction of a current flowing through a first power supply line conductor (the power supply line 13) disposed in the first conductor holding layer together with the communication line conductors and a direction of a current flowing through a second power supply line conductor (the power supply line 17) disposed in the second conductor holding layer may be set to be the same.

According to the flexible wiring member having the above configuration, both the first power supply line conductor and the second power supply line conductor can be used in a manner of being electrically connected in parallel in order to flow currents in the same direction. Therefore, even when a thin conductor is used, the cross-sectional area of the conductor required for the power supply line to flow a desired current can be easily ensured.

In the flexible wiring member, usage restrictions may be made in which a direction of a current flowing through a first power supply line conductor (the power supply ground line 22) disposed in the first conductor holding layer together with the communication line conductors and a direction of a current flowing through a second power supply line conductor (the power supply line 21) disposed in the second conductor holding layer may be set to be opposite to each other and the first power supply line conductor is used as a ground line.

According to the flexible wiring member having the above configuration, since the power supply ground line is provided in the wiring member, even when the flexible wiring member is wired in a vehicle made of resin in which the body ground cannot be used, a path of the ground line can be easily ensured. Since the power supply ground line is provided in the same layer as the communication line conductor, it is easy to make a noise countermeasure.

In the flexible wiring member, the power supply line conductors (the power supply lines 13 and 17) and the communication line conductors (the communication lines 14 and 15) may be made of conductive metals having a foil shape and having the same thickness.

According to the flexible wiring member having the above configuration, since each conductor is very thin, it is easy to increase the flexibility of the entire wiring member in the thickness direction.

According to the flexible wiring member of the present invention, it is possible to implement a flexible wiring member that allows energization of a relatively large current, has high flexibility, and is easy to be wired. That is, since the power supply line conductor and the communication line conductor are arranged in the wiring member having a structure in which the plurality of conductor holding layers are stacked, the power supply line and the communication line that pass through a common wiring path can be implemented by wiring the single wiring member only. Since the power supply wire conductors having a wide width are disposed in adjacent layers, even when a large cross-sectional area is required to handle a relatively large current, the power supply wire conductors of the respective layers can be made of a thin material, and the flexibility of the entire wiring member in the thickness direction can be increased. Since the plurality of communication line conductors are disposed in only one of the first conductor holding layer and the second conductor holding layer, it is easy to make a noise countermeasure. Since the insulating resin that separates the plurality of conductor holding layers from one another forms a direct coating on the power supply wire conductor, it is easy to reduce the number of components constituting the wiring member and simplify a manufacturing process.

What is claimed is:

1. A flexible wiring member capable of electrically connecting a plurality of desired points separated in a length direction, the flexible wiring member comprising:

a plurality of conductor holding layers that are formed in a state of being stacked in a thickness direction and being electrically insulated from one another; and a power supply ground line conductor that has a wide width and a plurality of communication line conductors that have a width smaller than that of the power supply ground line conductors are disposed in a first conductor holding layer and a power supply line conductor that has a wide width is disposed in a second conductor holding layer, the first conductor holding layer and the second conductor holding layer being adjacent to each other in the thickness direction;

wherein the plurality of conductor holding layers are formed by an insulating resin, and directly cover the power supply line conductor, the power supply ground line conductor, and the communication line conductors, wherein a width obtained by adding the width of the power supply ground line conductor, the width of the plurality of communication line conductors and the width of portions of the first conductor holding layer disposed therebetween matches the width of the power supply line conductor disposed in the second conductor holding layer, and wherein, in the first conductor holding layer where the power supply ground line conductor is disposed, the communication line conductors are adjacent to each other.

2. The flexible wiring member according to claim 1, wherein each of the power supply line conductors is a high-voltage power supply line conductor.

3. The flexible wiring member according to claim 1, wherein a width dimension of the power supply ground line conductor disposed in the first conductor holding layer together with the communication line conductors is formed to be smaller than a width dimension of the power supply line conductor disposed in the second conductor holding layer.

4. The flexible wiring member according to claim 1, wherein usage restrictions are made in which a direction of a current flowing through the power supply ground line conductor disposed in the first conductor holding layer together with the communication line conductors and a direction of a current flowing through the power supply line conductor disposed in the second conductor holding layer are set to be opposite to each other.

5. The flexible wiring member according to claim 1, wherein the power supply line conductor, the power supply ground line conductor and the communication line conductors are made of conductive metals having a foil shape and having the same thickness.

* * * * *